United States Patent [19]

Ham

[11] Patent Number: 4,519,743
[45] Date of Patent: May 28, 1985

[54] HELICOPTER INDIVIDUAL BLADE CONTROL SYSTEM

[75] Inventor: Norman D. Ham, Brookline, Mass.

[73] Assignee: Massachusetts Institute of Technology, Cambridge, Mass.

[21] Appl. No.: 394,832

[22] Filed: Jul. 2, 1982

Related U.S. Application Data

[63] Continuation-in-part of Ser. No. 132,705, Mar. 21, 1980, abandoned.

[51] Int. Cl.³ .................. B64C 27/44; B64C 27/70
[52] U.S. Cl. .................................... 416/1; 416/31; 416/114; 244/17.13
[58] Field of Search .................. 416/1, 31, 158, 18, 416/114, 104, 105; 244/17.13, 191

[56] References Cited

U.S. PATENT DOCUMENTS

| | | | |
|---|---|---|---|
| 2,554,512 | 5/1951 | Varian | 244/191 X |
| 2,605,093 | 7/1952 | Dorand | 416/31 X |
| 2,620,888 | 12/1952 | Avery | 416/114 |
| 2,624,531 | 1/1953 | Stalker | 416/31 X |
| 3,010,679 | 11/1961 | Kelley | |
| 3,050,276 | 8/1962 | Wissinger | |
| 3,469,644 | 9/1969 | Harding | 416/31 X |
| 3,482,805 | 12/1969 | Knemeyer | 416/31 X |
| 3,520,498 | 7/1970 | Murphy | |
| 3,647,315 | 3/1972 | Rostad et al. | 416/31 |
| 3,744,928 | 7/1973 | Hansen et al. | 416/31 |
| 3,795,375 | 3/1974 | Lemnios | 416/31 X |
| 3,866,859 | 2/1975 | Hill | 244/17.13 |
| 3,938,762 | 2/1976 | Murphy | 416/31 X |
| 3,960,348 | 6/1976 | Fowler et al. | 416/31 X |
| 4,025,230 | 5/1977 | Kasten | 416/31 X |

FOREIGN PATENT DOCUMENTS 1481601  9/1969  Fed. Rep. of Germany ... 244/17.13

OTHER PUBLICATIONS

Kretz, M., "Research in Multicyclic and Active Control of Rotary Wings", *Vertica,* vol. 1, pp. 95–105, Pergamon Press, Great Britain, 1976.

Kretz, M., "Relaxation of Rotor Limitations by Feedback Control", 33rd Annual National Forum of the American Helicopter Society, May, 1977.

Kretz, M. and Larche', M., "Future of Helicopter Rotor Control", Fifth European Rotorcraft and Powered Lift Aircraft Forum, Amsterdam, Sep., 1979.

Sissingh, G. J., "Variation of Rotor Dynamic Response by Self-Contained Mechanical Feedback", Advanced Research Division, Hiller Aircraft Corportion.

*Primary Examiner*—Everette A. Powell, Jr.
*Attorney, Agent, or Firm*—Arthur A. Smith; James M. Smith

[57] ABSTRACT

The pitches of the several blades in a helicopter rotor assembly are controlled by individual blade control subsystems. Those blade control subsystems respond to the output signals from accelerometers mounted on the blades. The signals from the accelerometers are used to control the pitch of the blades on which the accelerometers are mounted as well as the pitch of other blades. By appropriate orientation of any accelerometer and filtering within a particular feedback subsystem, each subsystem is designed to correct particular modes of blade motion to the exclusion of other modes of motion by varying lift.

26 Claims, 14 Drawing Figures

HELICOPTER INDIVIDUAL BLADE CONTROL SYSTEM

The Government has rights in this invention pursuant to Grant No. NSG-2266, awarded by National Aeronautics and Space Administration.

RELATED APPLICATION

This application is a continuation-in-part of application 132,705, filed March 21, 1980 by Norman D. Ham, now abandoned.

FIELD OF THE INVENTION

The invention relates to helicopters in which the pitch of each rotor blade is individually controlled by a feedback system to increase helicopter stability.

BACKGROUND

In conventional helicopters, the rotor blade pitch is varied both collectively and monocyclically. The rotor blade pitch is varied collectively to control vertical lift or altitude. To make the helicopter travel in directions other than vertical, the rotor blades are tilted monocyclically.

In controlling vertical lift or mean thrust, the collective pitch is set without regard to the rotational position of each blade. The change in lift on most helicopters is created by a change in blade pitch which alters the blade's angle of attack relative to the air. The higher the angle of attack, the more highly loaded the blade becomes in creating more lift. The helicopter's engine must produce greater power to maintain the generally constant speed of rotation when blade loading is increased.

Alternatives to pitch control of helicopter lift which have been applied include blade flaps, jet flaps and circulation control. A blade flap comprises a hinged partial span of the blade used to deflect air for greater or lesser lift. Jet flaps and circulation control are more subtle methods of changing lift that rely on changes in generated air currents rather than on mechanical reconfiguration. Furthermore, it is also possible to adjust lift by changing the blade rotation speed but this is not commonly done.

To change the direction of thrust longitudinally or laterally from the vertical, the pitch of each blade is varied by a given amount once per rotor revolution, the blades being out of phase with each other. Generally the rotor of a conventional helicopter is made to tilt by having one half of the disc traced out by the rotating blades achieve more lift than the other half. Normally this results in the pitch of a blade going through a complete cycle from maximum to minimum during one revolution. Cyclic pitch control as just described can also be supplanted by the previously described alternate lift control methods if they are applied monocyclically.

The pitch of each blade in a conventional rotor is controlled by a control rod, and the positions of all such rods are controlled by a single swashplate. The control rods are mounted circumferentially around the swashplate so that axial movement of the plate causes collective changes in pitch. Longitudinal and lateral tilting of the swash-plate results in cyclic pitch control. The pitch of each blade may be set directly by the control rod or through mechanical flaps on the blades or the like.

FIG. 1 illustrates a typical swash-plate system. A plate 12 is mounted for rotation with the rotor 14 about the rotor axis. The axial position of plate 12 along the rotor shaft and the tilt of the plate are determined by a nonrotating plate 16 which is in turn moved by a number of plate actuating rods 18. The pitch of each rotor blade 20 at any angle of rotation is controlled by the axial position of a rod 22. If the plate 12 is level, all rods 22 hold the several blades at the same constant pitch. When, however, the plate 12 is tilted by selective actuation of plate actuators 18, each rod 22 reciprocates one cycle for each revolution of rotor 14 and plate 12. The result is a monocyclic pitch change.

The rotor blades operate in a severe aerodynamic environment. Flapping and bending of each blade can be caused by atmospheric turbulence, the vortices of preceding blades, fuselage interference, and aerodynamic or mass mismatch between blades. Flapping and bending might also result from the changing velocity of the blade relative to the surrounding air with rotation; that change in velocity can result in retreating-blade stall flutter during flight or sailing during shutdown.

The most significant modes of undesired blade motion follow. In the blade flapping mode for a hinged blade, shown in the solid lines of FIG. 2A, a blade 24 flaps on a hinge 26. For a hingeless blade, the corresponding mode is the first flatwise bending mode of the blade. The first flatwise bending mode of a hinged blade is shown in broken lines in FIG. 2A, and such bending corresponds to the second flatwise bending mode of a hingeless blade. FIG. 2B illustrates the first inplane bending mode of a blade where there is no inplane hinge near the root of the blade. Inplane bending or flapping is referred to as lagging. Finally, in a first torsion mode, the blade is subjected to a twisting action along its own axis. The flapping mode (first flatwise bending mode for hingeless rotors) and the first inplane bending mode are excited by gusts and other natural air turbulence and by blade instabilities; they are generally of relatively low frequencies, that is of frequencies less than the rotor frequency. On the other hand, the first flatwise bending mode (second flatwise mode for hingeless rotors), and the torsion mode are excited by vibration and stall flutter which are relatively high frequency disturbances.

To reduce the instability of the rotor with the above environmental conditions and to reduce the resultant stresses and power losses, Marcel Kretz has proposed the use of individual actuators for the rotor blades, each actuator being controlled by a feedback circuit. *Vertica*, 1976, Vol. 1, pp 95–105. Feedback is provided by pressure sensors mounted on each blade or by strain gauges or the like associated with the blade. The resultant control system provides for multicyclic individual blade control which reduces the adverse effects of the environment while still providing for the usual collective and monocyclic controls by the helicopter pilot.

An object of the present invention is to provide individual control of the rotor blades with feedback of higher reliability and having better control characteristics than has heretofore been available.

SUMMARY

In accordance with this invention, the feedback control responds to the angular acceleration of the blade by providing at least one accelerometer on the blade. Preferably, a separate feedback circuit to an actuator is utilized for each bending, flapping, lagging or torsion mode intended to be corrected. The feedback driven actuation attenuates undesired blade movement through modification of individual blade lift. To that end, the accelerometer utilized in a particular feedback circuit is oriented to maximize its sensitivity to the angular movement of interest and the particular feedback circuit operates over a selected frequency range in which the particular mode of undesired flapping or bending occurs. To provide for increased attenuation of the undesired flapping and bending, cross feedback is provided from accelerometers mounted on other blades.

In one example of the invention designed primarily to correct for the blade flapping mode of a hinged blade or the first flatwise bending mode of a hingeless blade, an accelerometer is mounted near the end of the blade to sense acceleration of the blade normal to the blade axis. Advantageously, the accelerometer output is negligible at frequencies close to the rotational frequency of the rotor, that is at the pilot's control frequency.

BRIEF DESCRIPTION OF THE DRAWINGS

The foregoing and other objects, features and advantages of the invention will be apparent from the following more particular description of a preferred embodiment of the invention, as illustrated by the accompanying drawings in which like reference characters refer to the same parts throughout the different views. The drawings are not necessarily to scale, emphasis instead being placed upon illustrating the principles of the invention.

FIGS. 2A and 2B schematically illustrate three modes of flapping and bending of a rotor blade with aerodynamic disturbances and the like;

DESCRIPTION OF PREFERRED EMBODIMENTS OF THE INVENTION

Figure 2A:
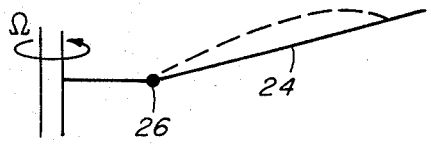
Figure 2B:
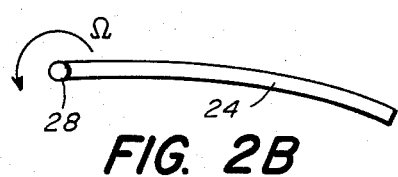
Figure 1:
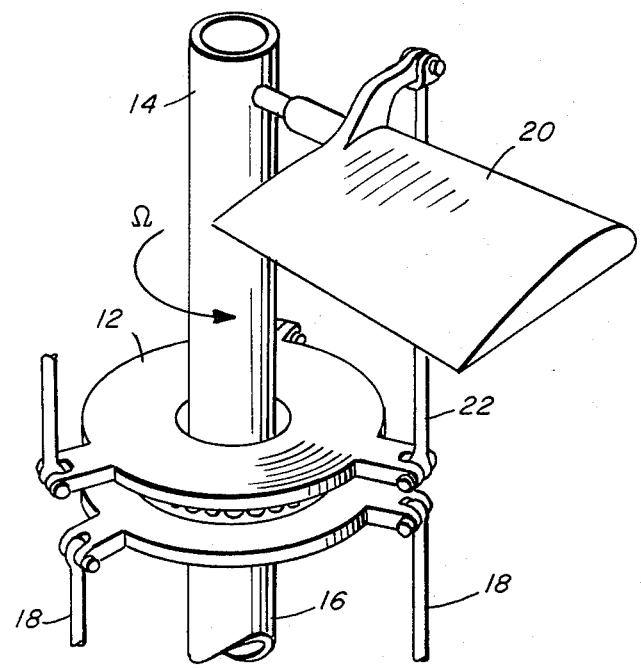
FIG. 1 is an illustration of a conventional swash-plate system for collective and cyclic control of the rotor blade pitch.
Figure 3:
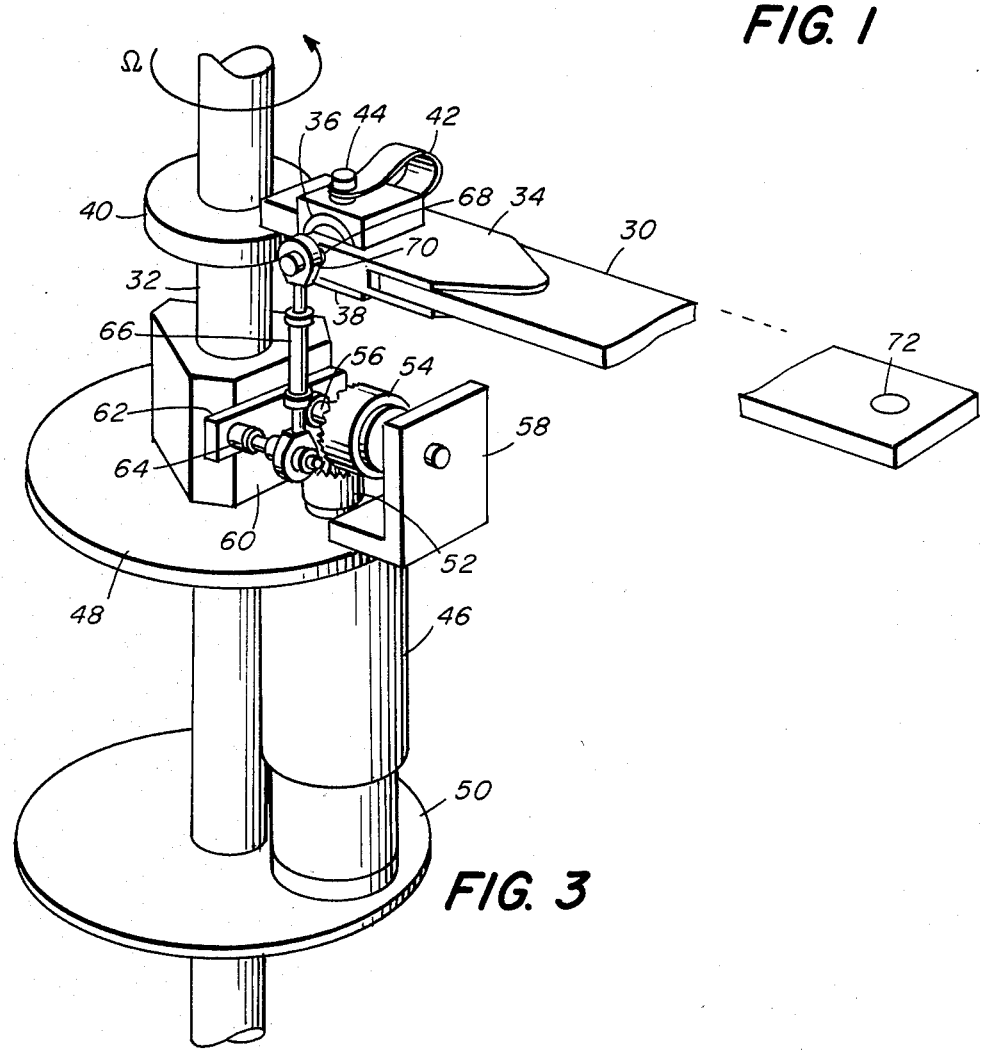
FIG. 3 is a perspective view of a rotor blade and pitch actuator assembly with an accelerometer mounted to the blade to provide feedback in accordance with this invention.

A test assembly for demonstrating one embodiment of the present invention is shown in FIG. 3. A blade 30, the pitch of which is to be controlled, is mounted for rotation with a rotor shaft 32. The rotor blade is rigidly attached to a steel fork assembly 34. That fork is bolted to the inner race 36 of a spherical bearing. The spherical bearing is contained within a steel support block 38 which is clamped to a plate 40 on the rotor shift 32. The spherical bearing 36 allows for articulated blade motion about intersecting pitch, flap and lead-lag axes, the intersection of the axes being offset from the hub by approximately two inches.

A 0.005 inch thick curved steel flexure 42 is mounted between the block 38 and the fork assembly 34. The flexure supports strain gauges which provide a torsional output corresponding to blade flapping and a bending output corresponding to blade pitch angle. The flexure 42 is free to rotate about the lead-lag axis by means of a pin 44 so that no lead-lag signal is obtained. The strain gauges allow for monitoring of the blade dynamics and also provide for feedback signals within a servomotor loop to be described.

The pitch of each blade on the rotor is controlled individually by a servomotor through a series of linkages. Specifically, a motor/tachometer 46 is mounted between two quarter inch thick aluminum discs 48 and 50 mounted to the rotor shaft 32. A radial transmission shaft 56 is suspended between bearings in blocks 58 and 60 on the upper plate 48. A pinion 52 on the motor shaft drives a spiral bevel gear 54 with a 2:1 gear reduction ratio. Rotation of the shaft 56 causes a crank 62 to rotate a crank pin 64. The pin 64 is in turn connected to a linking rod 66 which drives a bolt 68. The bolt 68 is fixed to the fork assembly 34 and extends through the pitch axis. A spherical bearing 70 prevents blinding of the link 66 and bolt 68 with changes in pitch.

In accordance with this invention, at least one accelerometer 72 is mounted on the rotor balde to provide a feedback signal to the servomotor. The use of accelerometers is an improved and extremely sensitive method of sensing precise blade motion and providing independent rotor blade control.

Various types of accelerometers may be used in this system, examples of which are a piezoelectric transducer and a known mass mounted on a spring. When the object onto which the accelerometer is mounted accelerates, the accelerometer may respond only to force in a particular direction depending on the accelerometer orientation. The force measured is proportional to the acceleration in the direction measured. Accelerometers measure accelerations which occur at relatively high frequencies rather than slow changes of position.

In this particular embodiment, the accelerometer 72 is mounted so that it senses acceleration in a direction perpendicular to the surface of the blade. The accelerometer is thus able to sense the blade flapping mode.

Figure 4:
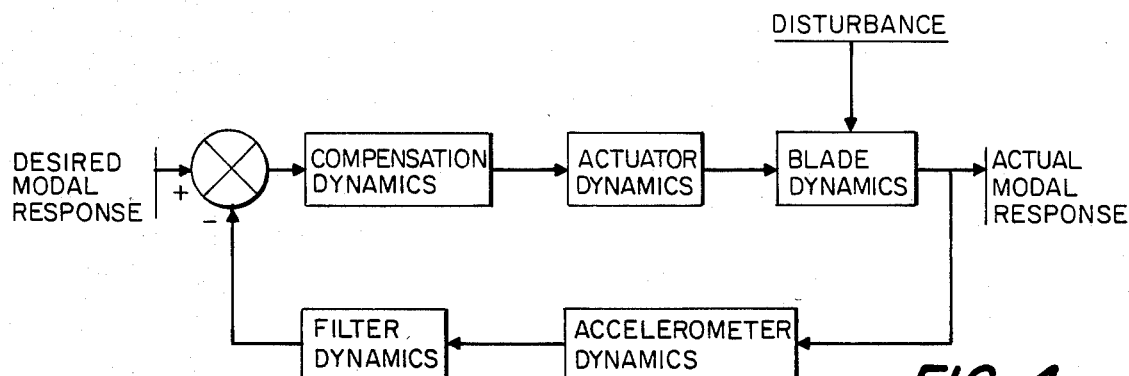
FIG. 4 is a block diagram of an individual blade control subsystem in accordance with this invention.

In order to control a particular modal response of the blade to environmental and other disturbances, the accelerometer is connected in an individual blade control subsystem as shown in FIG. 4. After filtering, the accelerometer output in combined with a desired modal response signal from the pilot's controls, and the combined signal is applied through compensation electronics to the servomotor pitch actuator. The actuator then automatically controls the pitch of the individual blade to counter the effects of the disturbance.

Various methods of blade lift control which are amenable to the blade control system may be substituted for blade pitch adjustment to attenuate disturbances. The crucial aspect of the system is the use of individual blade controls to adjust blade lift in response to disturbance.

One feature of the present invention is that each modal response or group of responses can be controlled by means of a separate feedback loop such as shown in FIG. 4. To that end, the flapping, bending, torsional and inplane bending modes can be sensed by accelerometers oriented to maximize sensitivity to the other modes. For example, for both the flapping and flatwise bending modes, the accelerometer is oriented to sense accelerations of the blade in a direction perpendicular to the surface of the blade. By placing the accelerometer on the torsional axis of the blade the accelerometer does not sense the torsional mode. To sense the torsional mode two accelerometers are mounted fore and aft of the torsional axis. By subtracting the output of one accelerometer from that of the other, the torsional acceleration signals are added and the flapping and bending signals are canceled.

As noted above, each of the primary modal responses of the blade to disturbances occurs in a characteristic frequency range. The specialization of feedback loops can be enhanced by positioning each accelerometer at a location such that the accelerometer sensitivity to a modal response which is not of interest is minimized at the characteristic frequency of that mode.

Figure 5:
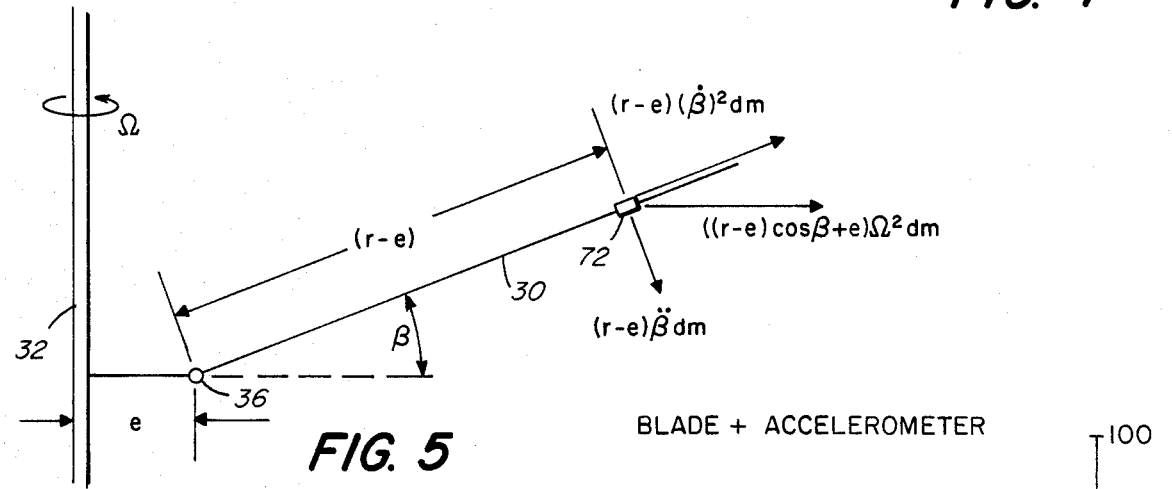
FIG. 5 is a schematic side view of a blade having an accelerometer mounted thereon.

A schematic of a blade with an accelerometer mounted to reduce the flapping mode which might result from wind gusts and the like is shown in FIG. 5. For a fully extended blade, the accelerometer is mounted at a radius R from the axis of rotation. With flapping of the blade about a hinge 36 through an angle $\beta$, the forces acting on a small mass in the blade are as indicated in the figure. In addition to the perpendicular force $(R-e)\ddot{\beta}dm$, two centrifugal forces act on a mass on the blade: the centrifugal force resulting from rotation at an angular velocity $\omega$ about the rotor axis and the centrifugal force resulting from the flapping of the blade about the hinge 36 at an angular velocity $\dot{\beta}$.

The accelerometer is oriented so that it senses accelerations which are perpendicular to the blade surface but not those which are in the direction along the blade axis. From FIG. 5 and using a small angle assumption, the flatwise acceleration measured by the accelerometer for the case of the blade flapping mode is given by:

$$a_F = (R-e)\ddot{\beta} + R\Omega^2\beta \quad (1)$$

For any sinusoidal variation of the flap angle, $\beta = \overline{\beta} \sin \omega t$ and $\ddot{\beta} = -\omega^2 \overline{\beta} \sin \omega t$:

$$a_F = [R\Omega^2 - (R-e)\omega^2]\overline{\beta} \sin \omega t \quad (2)$$

It can be seen from equation 2 that the accelerometer signal is strongly frequency dependent and at frequencies close to the rotational frequency, $\omega = \Omega$, the output is negligible. Since the pilot's controls are at the rotor rotational frequency $\Omega$, the accelerometer advantageously does not respond to the pilot's controls but rather to disturbances at frequencies above and below the rotational frequency. It can also be seen that for low frequencies of $\omega$ much less than $\Omega$ the accelerometer output is proportional to the blade flapping angle $\overline{\beta} \sin \omega t$, and at high frequencies of $\omega$ much larger than $\Omega$ the signal is proportional to the flapping acceleration $-\omega^2 \overline{\beta} \sin \omega t$.

Figure 6A:
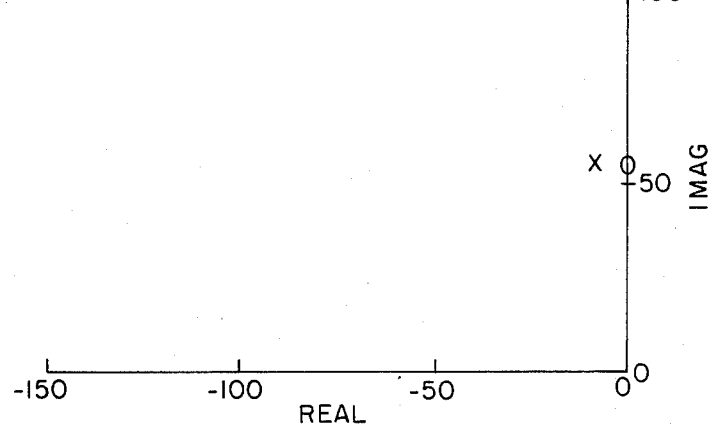
FIGS. 6A and 6B respectively show the root locus and Bode plots for flapping mode feedback system having an ideal actuator.
Figure 6B:
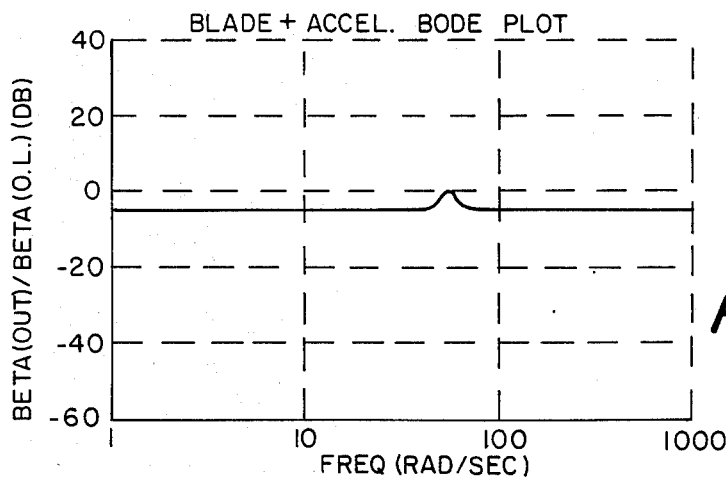

The root locus and Bode plots for a feedback circuit including the accelerometer and the blade dynamics, the actuator dynamics being ideal at unity gain, are shown in FIGS. 6A and 6B. The accelerometer contributes a complex conjugate pair of zeros located directly on the imaginary axis of the locus plot. As one increases the gain of the blade/accelerometer system, the blade pole moves directly over to this complex zero, reducing its damping while not significantly changing its natural frequency. The corresponding Bode plot shows that, because of the accelerometer's amplification of blade flapping accelerations at frequencies above rotor rotation, it is possible to attenuate high frequency flapping perturbations as well as low frequency disturbances. This represents a significant improvement over prior feedback subsystems. Such systems lack the complex zeros of the accelerometer and at frequencies above the rotor frequency can be expected to actually amplify the flapping angle. It can also be seen by the Bode plot that there is no attenuation of the angle at the rotor frequency, which is the pilot's control frequency. This results from the canceling of the flapping angle and flapping acceleration terms of Equation 2, a characteristic of the accelerometer sensing.

Figure 7:
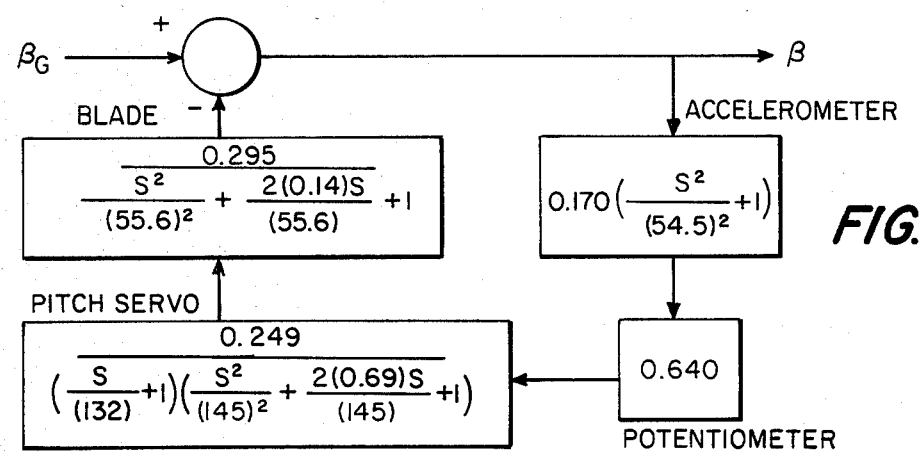
FIG. 7 is a block diagram of the subsystem of FIG. 4 for a particular feedback assembly used in testing the invention; the block diagram shows the transfer functions of each element of the system.

The block diagram, showing transfer functions for an actual implementation of the feedback control for the test apparatus of FIG. 3, is shown in FIG. 7. The transfer function of the accelerometer results from the particular accelerometer used and its orientation on the rotor blade. Due to the inherent filtering characteristics of the thus oriented accelerometer and of the servoactuator dynamics, no filtering is required in this case. Instead, only a potentiometer, used to adjust the accelerometer gain, is required in the feedback to the servosystem.

Figure 8:
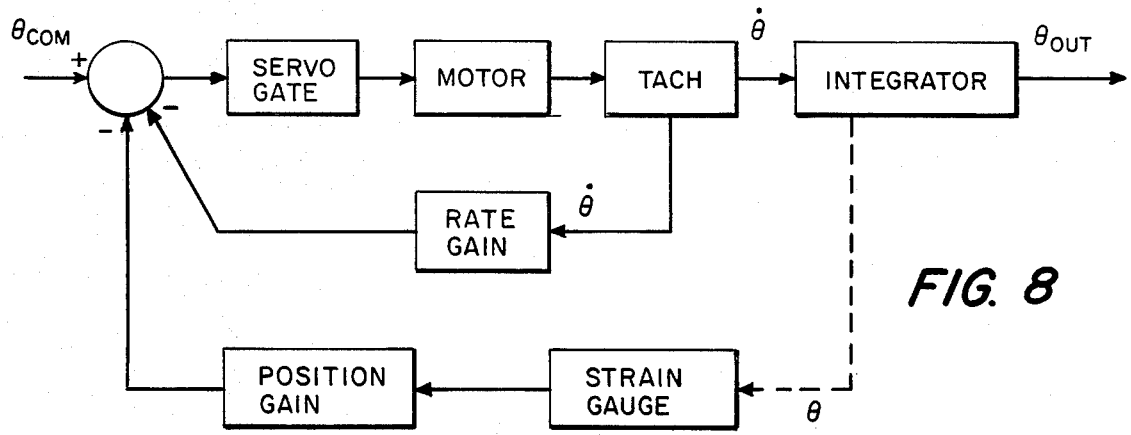
FIG. 8 is an electrical block diagram of a servosystem used to drive the motor in the actuator dynamics of FIG. 7.

Since the servomotor functions as a position control device, the actuator dynamics of FIG. 4 is implemented by the circuit of FIG. 8. That circuit incorporates appropriately weighted feedback signals to the motor amplifier from the motor tachometer and from the torsional strain gauge mounted on the flexure 42. The resultant transfer function is shown in the block of FIG. 7. The transfer function of the blade was determined by the physical characteristics of the test blade and rotor.

Figure 9A:
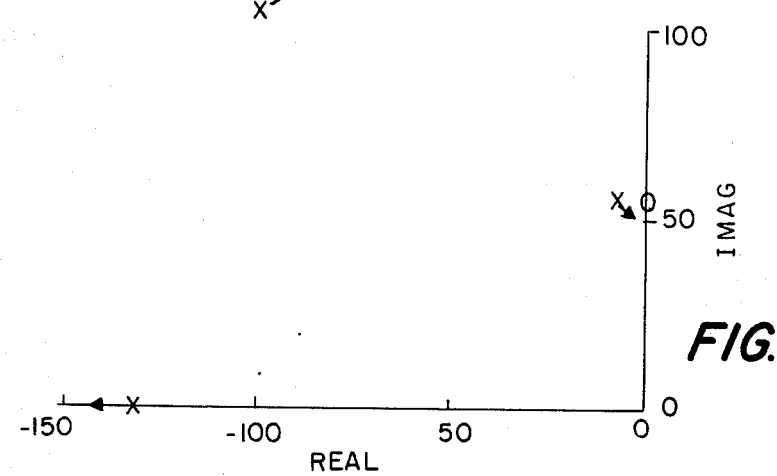
FIGS. 9A and 9B respectively show the root locus and Bode plots for the system of FIG. 8.
Figure 9B:
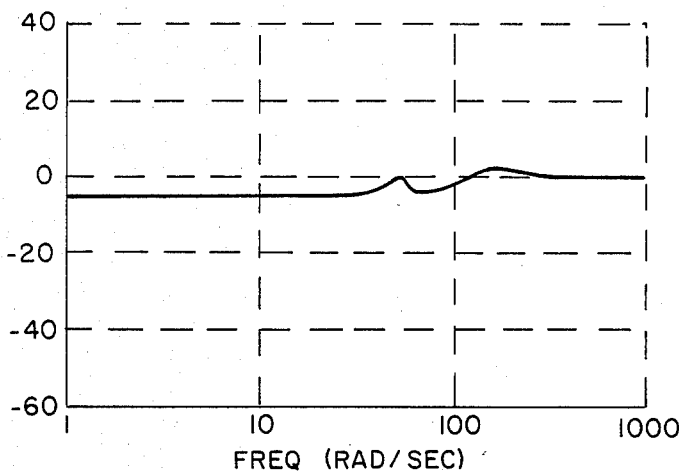

The root locus and Bode plots for the system of FIG. 7 are provided in FIGS. 9A and 9B. In the Bode plot, it can be seen that the accelerometer provides for nearly zero attenuation at the rotor rotational frequency of 100 radians per second. The nonattenuating region of the system above 100 radians per second results from the less than ideal characteristics of the actuator used. The actuator characteristics can be made more ideal so that even through this region there would be a resultant attenuation of the flapping angle. However, because the flapping mode is a low frequency mode, only the disturbance frequencies less than the rotational frequency need be utilized in this particular feedback loop. If, on the other hand, this loop were to control the higher vibration frequencies, the actuator performance could be improved electronically for a particular frequency range of interest.

As noted above, a feedback subsystem may be designed to handle a group of modal responses to disturbances. For example, the system described above will alleviate low frequency pitching, rolling, horizontal and vertical disturbances as well as the primary gust disturbances. If needed, attenuation of the response to the pilot's control can be prevented by biasing the feedback signal by a signal proportional to control stick displacement.

Figure 10A:
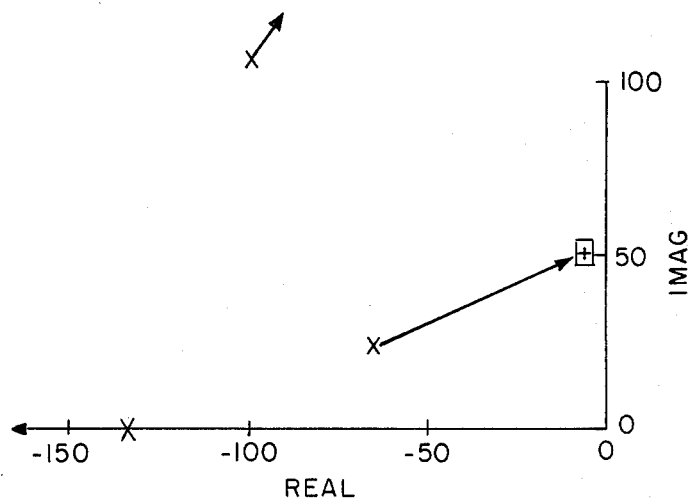
FIGS. 10A and 10B respectively show the root locus and Bode plots for a full size blade having the feedback signal coupled to an accelerometer on the preceding blade.
Figure 10B:
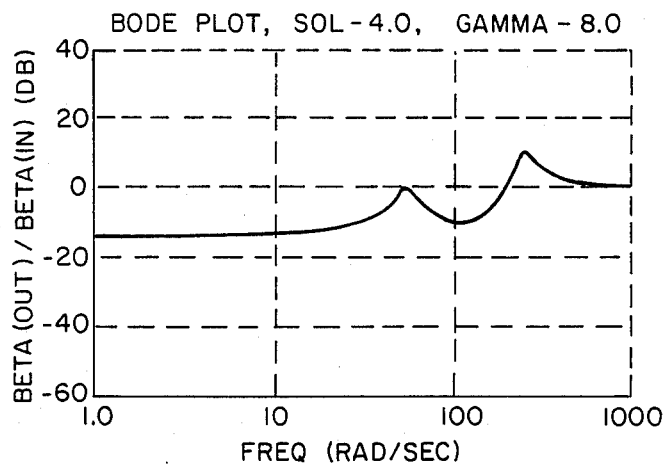

The root locus and Bode plots for a full size blade have been determined analytically and are shown in FIGS. 10A and 10B. Those plots also provide for interblade coupling; that is, a cross-feedback signal is provided from the accelerometer located on a preceding or succeeding blade to the actuator of the blade in question. In that manner, an additional control signal is provided in the feedback loop, that additional signal being advanced with respect to the feedback signal of the loop. That advance control signal manifests itself as an increase in effective damping of the blade, and as shown in the Bode plot provides for significantly better attenuation.

In the preferred embodiment of this invention each blade is controlled by its own pitch actuator to provide individual blade lift control. However, the conventional swash-plate may still be used, either to the exclusion of or along with individual controls. For example, the swash-plate provides for three degrees of freedom and by appropriate design of the swash-plate control circuitry, multicyclic control can be provided for three individual blades. With four or more blades additional degrees of freedom are required, and the swash-plate might be used in conjunction with actuators as described above. Also, in any system the swash-plate may be used in its conventional fashion to provide collective and monocyclic pitch control while individual actuators provide incremental pitch control.

While the invention has been particularly shown and described with reference to preferred embodiments thereof, it will be understood by those skilled in the art that various changes in form and details may be made therein without departing from the spirit and scope of the invention as defined by the appended claims. For example, individual blade lift may be varied without change of rotor blade pitch by means of flaps, jet flaps or circulation control.

I claim:

1. An aircraft rotor assembly including lift control means for control of lift of aircraft blades, movement sensor means associated with each aircraft blade, and electrical feedback circuitry for controlling the lift control means in response to signals generated by the movement sensor means, that rotor assembly characterized by:
   the sensor means associated with each rotor blade comprising at least one accelerometer oriented relative to a direction of blade movement, caused by characteristic disturbances of blade motion, to sense that blade movement.

2. An aircraft rotor assembly including lift control means for control of lift of aircraft blades, movement sensor means associated with each aircraft blade, and electrical feedback circuitry for controlling the lift control means in response to signals generated by the movement sensor means, that rotor assembly characterized by:
   the sensor means associated with each rotor blade comprising at least one accelerometer oriented relative to a direction of blade movement, caused by characteristic disturbances of blade motion, to sense at least one distinct mode of blade bending, flapping, or torsion.

3. A helicopter rotor assembly including actuator means for individually controlling the pitch angle of several helicopter blades in the assembly, movement sensor means associated with each helicopter blade, and electrical feedback circuitry for controlling the actuator means in response to signals generated by the sensor means, that rotor assembly characterized by:
   the sensor means associated with each rotor blade comprising at least one accelerometer oriented in a manner associated with a distinct direction of blade movement caused by characteristic disturbances of blade motion to sense a corresponding distinct mode of angular acceleration of the blade.

4. A helicopter rotor assembly including actuator means for control of pitch angle of helicopter blades, movement sensor means associated with each helicopter blade, and electrical feedback circuitry for controlling the actuator means in response to signals generated by the movement sensor means, that rotor assembly characterized by:
   the sensor means associated with each rotor blade comprising at least one accelerometer oriented relative to a direction of blade movement, caused by characteristic disturbances of blade motion, to sense at least one distinct mode of blade bending, flapping or torsion.

5. A rotor assembly as claimed in claim 1, 2, 3 or 4 including at least two accelerometers on each blade, the accelerometers being oriented to sense at least one specific mode of blade flapping, bending or torsion and thereby provide a feedback signal to control a distinct mode of blade motion.

6. A rotor assembly as claimed in claim 1, 2, 3 or 4 wherein an electronic feedback subsystem includes means for limiting that subsystem to a particular frequency range above or below the pilot control frequency and in which the feedback subsystem is designed to control a blade motion having a characteristic frequency within that particular frequency range.

7. A rotor assembly as claimed in claim 1, 2, 3 or 4 wherein an accelerometer is mounted and oriented on the helicopter blade to produce a negligible output at the pilot control frequency.

8. A rotor assembly as claimed in claim 1 or 2 wherein the lift control means can control lift of each rotor blade individually without directly affecting the lift on other blades.

9. A rotor assembly as claimed in claim 1, 2, 3 or 4 further comprising circuit means for associating signals of several accelerometers on an individual blade for control of an individual blade.

10. A rotor assembly as claimed in claim 1, 2, 3 or 4 further comprising circuit means for associating signals of several accelerometers on several helicopter blades for control of an individual blade.

11. A rotor assembly as claimed in claim 1, 2, 3 or 4 wherein accelerometers are mounted at locations on helicopter blades spaced away from the blade ends where the blades are mounted to the rotor hub.

12. A helicopter rotor assembly including actuator means for control of pitch angle of helicopter blades, movement sensor means associated with each helicopter blade, and electrical feedback circuitry for controlling the actuator means in response to signals generated by the movement sensor means, that rotor assembly characterized by:
   the sensor means associated with each rotor blade being at least one accelerometer mounted such that it measures acceleration perpendicular to the major axis of the blade.

13. A rotor assembly as claimed in claims 1, 2, 3 or 12 wherein the accelerometer is oriented so as to maximize the signal produced by a particular mode of blade motion to be attenuated.

14. A rotor assembly as claimed in claims 3, 4 or 12 wherein the actuator means for control of pitch angle is capable of blade control of each rotor blade individually without mechanically affecting other blades.

15. A method for active lift control of aircraft rotor blades characterized by:
   a. sensing motion of the aircraft blades by means of at least one accelerometer positioned on one of said aircraft rotor blades, oriented relative to a direction of movement of at least one distinct mode of blade bending, flapping or torsion,
   b. directing signals from the accelerometer through a feedback circuit, and
   c. controlling a blade lift means to change individual blade lift in response to a control signal from the feedback circuit.

16. The method for active lift control of aircraft rotor blades as claimed in claim 15 wherein the step of controlling blade lift comprises:
   a. controlling an actuator means to change blade pitch in response to a control signal from the feedback circuit.

17. A method for active lift control of aircraft rotor blades as claimed in claim 16 further characterized by:
   controlling the blade pitch of each rotor blade independently.

18. A method for active lift control of aircraft rotor blades as claimed in claim 16 further characterized by:
   integration of the accelerometer signals with pilot control commands in the feedback circuit for controlling blade lift.

19. A method for active control of rotor blades as claimed in claims 15 wherein:
   accelerometer signals in the feedback circuit are utilized to produce electronic modal decomposition of blade movements so that the control system may respond specifically to distinct modes of blade motion.

20. A method for active control of aircraft rotor blades as claimed in claim 15 further characterized by:
   electronic filtering of accelerometer signals to prevent undesirable feedback from the accelerometers.

21. A method for active lift control of aircraft rotor blades as claimed in claim 16 further characterized by:
   changing blade pitch angle to attenuate rotor blade harmonic vibrations and stress.

22. A method for active lift control of aircraft rotor blades as claimed in claim 16 further characterized by:
   changing blade pitch angle to attenuate aerodynamic stall effects.

23. A method for active control of rotor blades as claimed in claim 15 further characterized by:
   changing blade lift to attenuate blade and vehicle aerodynamic interactions and instabilities.

24. A method for active lift control of aircraft rotor blades as claimed in claim 16 further characterized by:
   changing blade pitch angle to attenuate inplane bending of helicopter rotor blades.

25. A method of active control of rotor blades as claimed in claim 15 further characterized by:
   utilizing associative integration of multiple sensor signals from several blades to produce active control of an individual rotor blade.

26. A method of active control of rotor blades as claimed in claim 15 further characterized by:
   attenuating rotor blade disturbances caused by wind gusts.

* * * * *